United States Patent [19]

Fish

[11] Patent Number: 4,940,209
[45] Date of Patent: Jul. 10, 1990

[54] LEVERED FLUID DRAIN VALVE

[76] Inventor: Robert D. Fish, 330 S. Mentor #134, Pasadena, Calif. 91106

[21] Appl. No.: 305,070

[22] Filed: Feb. 2, 1989

[51] Int. Cl.⁵ .............................................. F16K 51/00
[52] U.S. Cl. .................................. 251/144; 251/149.4; 251/149.6; 184/1.5; 123/196 R
[58] Field of Search ........................ 123/196 R, 196 S; 184/1.5, 106; 251/128, 291, 346, 149.7, 144, 149.4, 149.6; 137/572

[56] References Cited

U.S. PATENT DOCUMENTS

| | | | |
|---|---|---|---|
| 2,318,965 | 5/1943 | Parker et al. | 251/149.1 |
| 2,669,414 | 2/1954 | Ketchpel et al. | 251/252 |
| 3,302,660 | 8/1964 | Haag | 251/304 |
| 3,486,730 | 12/1969 | Potash | 251/149.7 |
| 3,721,259 | 3/1973 | True | 251/128 |
| 3,727,638 | 5/1973 | Zaremba, Jr. et al. | 137/572 |
| 3,871,483 | 3/1975 | Espinosa et al. | 184/1.5 |
| 3,879,013 | 5/1975 | Hajek | 251/144 |
| 3,948,481 | 5/1976 | Pollock | 251/351 |
| 4,025,048 | 5/1977 | Tibbitts | 251/144 |
| 4,208,034 | 6/1980 | Ohlsson | 251/149 |
| 4,269,237 | 6/1981 | Berger | 141/383 |
| 4,386,639 | 6/1983 | Gable et al. | 184/1.5 |
| 4,449,613 | 5/1984 | Price | 184/1.5 |
| 4,660,803 | 4/1987 | Johnston | 251/149 |
| 4,699,356 | 10/1987 | Hargrove et al. | 251/149 |
| 4,709,722 | 12/1987 | Knapp | 184/1.5 |
| 4,745,894 | 5/1988 | Laipply et al. | 123/196 R |
| 4,776,430 | 10/1988 | Rule | 184/1.5 |
| 4,776,431 | 10/1988 | Poling | 123/196 R |
| 4,815,566 | 3/1989 | Caruso | 184/1.5 |

OTHER PUBLICATIONS

Consumer Report, p. 679 (Nov. 1988).

Primary Examiner—E. Rollins Cross
Attorney, Agent, or Firm—Robert D. Fish

[57] ABSTRACT

An oil drain valve consisting of a drain fitting and a removable actuator. The drain fitting is substantially the size and shape of a standard oil, is axially hollowed, and is perforated in the walls thereof to form a passageway to drain oil from the oil pan. The passageway contains a spring-loaded ball valve. The drain fitting is internally threaded on its bolt end to accommodate the external threads of the actuator. A mechanically advantaged lever is positioned within the actuator such that tightening and loosening of the actuator within the drain fitting causes the opening and shutting of the ball valve. The actuator may be fitted to a hose and optional pump for disposal of the oil. A protective cap is mounted within the head end of the drain fitting when the fitting is not in use.

2 Claims, 1 Drawing Sheet

U.S. Patent   Jul. 10, 1990   4,940,209
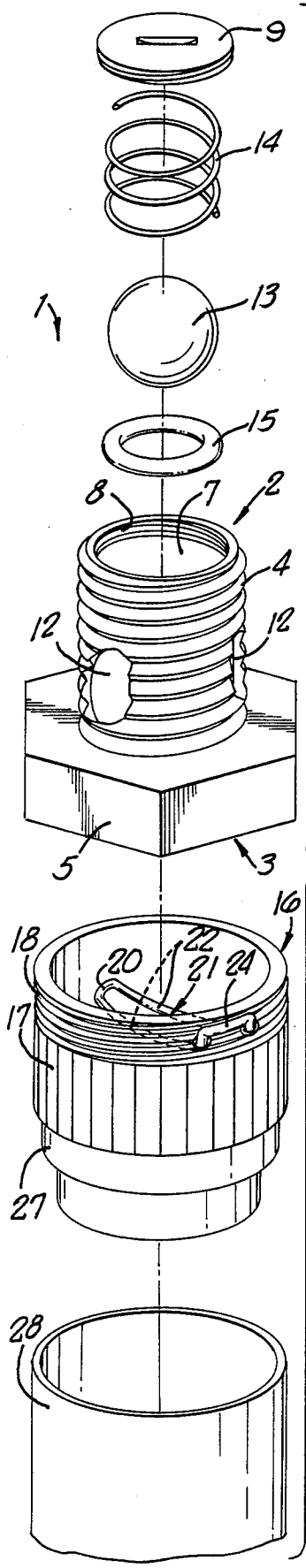
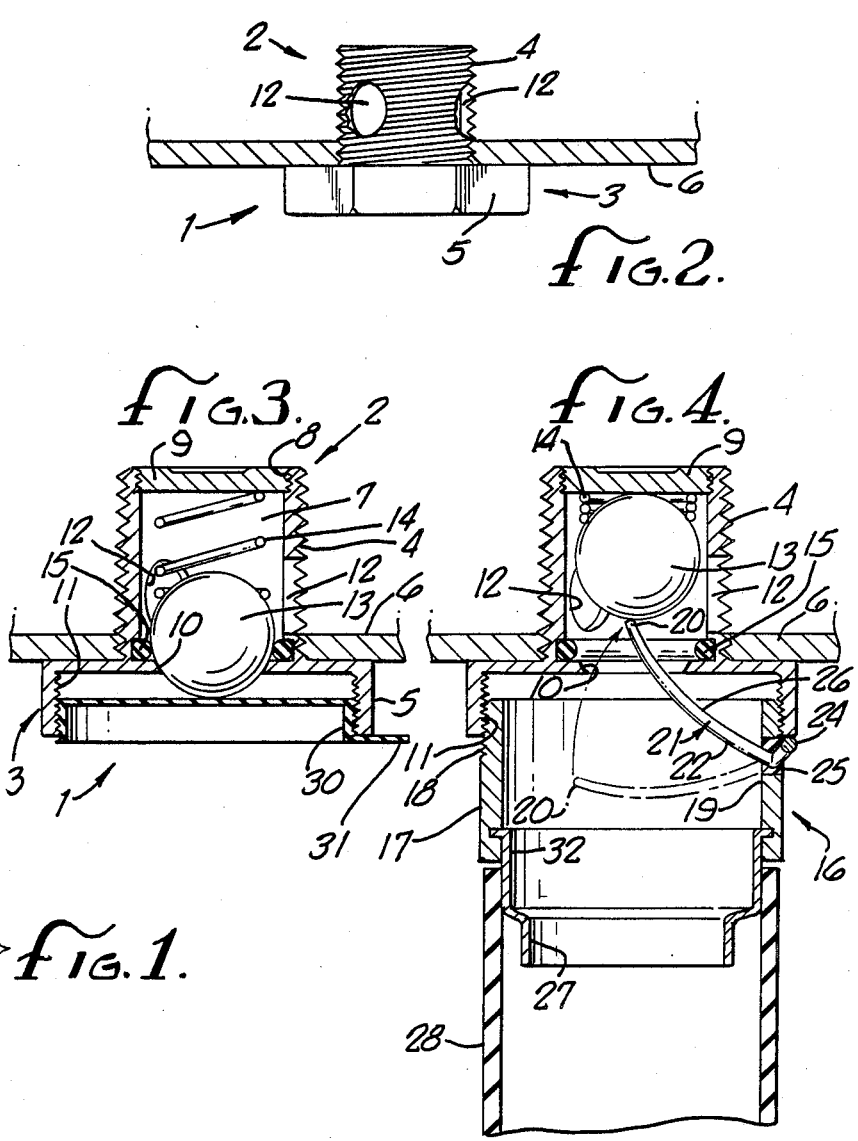
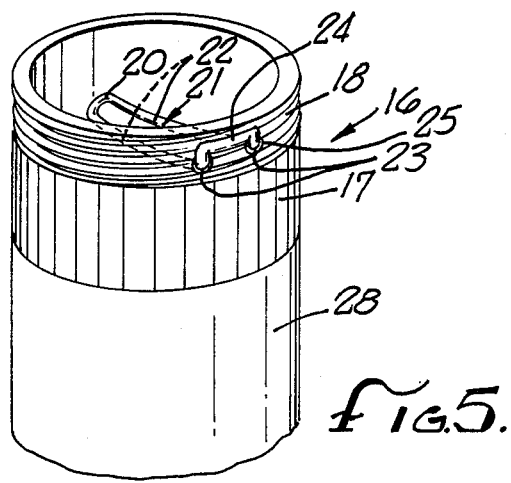

LEVERED FLUID DRAIN VALVE

BACKGROUND OF THE INVENTION

1. Field of the Invention

The present invention relates to valves, and more particularly to levered valves for draining fluid from a fluid reservoir.

2. Description of the Prior Art

Recommended maintenance for all internal combustion engines includes periodic oil changes. Oil is generally drained from an oil pan upon removal of a standard drain plug, located at the underside of the oil pan. Due to the low clearance created by the placement of the drain plug close to the ground, the oil change procedure can be difficult, messy and time consuming.

There are six factors which are essential for good marketplace acceptance of an oil drain valve, each and every one of which is an object and advantage of the presently described invention. The oil drain valve (1) must be essentially the same size and shape as a standard drain plug, thereby preventing damage to the valve or oil pan through contact with road hazards;

(2) must minimize the oil residue left remaining in the oil pan, thereby preventing contamination of the new oil;

(3) must maximize the flow of oil, thereby minimizing the time required for an oil change;

(4) must be dependable, thereby preventing inadvertent loss of oil during the operation of the engine;

(5) must provide for convenient operation; and (6) must be of simple design to facilitate low cost production.

The basic problem in meeting these six objectives is the small size limitation on the drain fitting. A one-piece valve unit necessarily involves either (1) an internal actuating component which would severely restrict the flow, or (2) an external actuating component which would protrude beyond that occupied by a standard drain plug. A two-piece valve unit requires a coupling which is (1) long enough to couple effectively and to fully operate the valve, but (2) short enough to avoid undue interference with the flow. The presently described invention solves this basic problem through the use of a two-piece valve with a mechanically advantaged lever mounted on a removable actuator.

While there are many existing valves which could accomplish one or more of these functions, the lack of marketplace acceptance demonstrates that no prior art has succeeded in meeting all of these criteria. The oil drain valve, Lappier and Formier U.S. Pat. No. 4,745,894 drains most of the oil in the oil pan and is adapted for connection to a hose. However, the valve is inadequate because it extends farther below the oil pan than a standard drain plug, and because the use of a hollow inner rod to conduct the flow of oil substantially reduces the flow of such oil.

Valves designed for other purposes are not readily adapted for use as an oil pan valve. Quick-coupler connectors such as those issued as Ohlsson U.S. Pat. No. 4,208,034 and Johnston and Garcia U.S. Pat. No. 4,660,803, and screw type connectors such as Parker U.S. Pat. No. 2,318,965 are inadequate for three reasons. (1) Such devices lack side holes and therefore would leave a residue of oil in the oil pan, significantly restricting the flow of oil. (2) By placing a male component within the bore of the female component, such devices do not take advantage of the maximum bore of the female component for oil flow. This further inhibits the oil flow. (3) Such devices incorporate a coupling mechanism which requires a greater axial travel than is acceptable in a devise as small as an oil drain valve.

Other valves are even less adequate. A beer-key tapping valve, as outlined in Haag U.S. Pat. No. 3,302,660, is inadequate because the valve is designed to be placed perpendicular to the bottom of a fluid container, and would not operate effectively when inserted into the bottom of an oil pan. Fluid sampling valves, as typified by Hargrove U.S. Pat. No. 4,699,356, are inadequate because they are larger than a standard drain plug, and because they would significantly restricts the flow of oil. A standard piston valve adapted to oil pan usage by the inclusion of perpendicular inlet and outlet openings, as typified by Ketchpel U.S. Pat. No. 2,669,414, is inadequate because either the handle would extend from the bottom of the oil pan, or it would have to be operated from within the oil pan. A pipe tapping valve typified by True U.S. Pat. No. 3,721,259, is inadequate because it is unnecessarily large and complex.

SUMMARY OF THE INVENTION

[Conclusion]

Unlike the prior art, the presently described invention satisfies each of the six criteria for a marketable drain plug.

1. The housing of a mechanically advantaged lever on a removable actuator instead of the drain fitting permits the drain fitting to remain the same size as a standard drain plug. This reduces the possibility that the drain fitting could be ripped out of the oil pan by contact with road hazards.

2. Multiple holes in the threaded side wall of the drain fitting juxtapose the floor of the oil pan. This ensures a rapid and complete drainage of the oil.

3. By utilizing a ball instead of a piston or hollow rod in the valve portion of the invention, (a) the maximum possible bore of the drain fitting is used to conduct the flow of oil, and (b) the valve is fully operative even though the lower end of the ball does not fully clear the drain holes.

4. The use of a ball valve produces an excellent seal and thereby makes the valve very dependable.

5. The adaptation of the actuator to permit connection to a hose and optional pump means that the receptacle for the oil may conveniently lie to the side of the car, and does not have to lie in the cramped space under the automobile during the oil change. This feature also greatly extends the variety of usable oil receptacles. The use of threads to connect the actuator to the drain fitting enables the draining operation to proceed without constant attention by the operator.

6. Construction of the invention requires only simple boring and threading techniques. This permits inexpensive manufacture and makes the device amenable to mass marketing.

BRIEF DESCRIPTION OF THE DRAWINGS

The six aforementioned objects and advantages of the presently described invention will be appreciated from the following description and accompanying drawings wherein:

FIG. 1 is an exploded view of the present invention.

FIG. 2 is a cross-section view of the drain fitting installed within an oil pan.

FIG. 3 is a cross-section view of the drain fitting in a closed position, showing the protective cap in place.

FIG. 4 is a cross-section view of the drain fitting in an open position, showing the actuator in place.

FIG. 5 is an angled side view of the actuator showing the lever.

DRAWING REFERENCE NUMERALS 1. drain fitting
2. tail end of drain fitting
3. head end of drain fitting
4. external threads
5. hexagonal bolt head
6. oil pan
7. axial passage
8. internal threads at tail end
9. end cap
10. valve seat
11. internal threads at head end
12. drain holes
13. ball
14. compression spring
15. O-ring
16. actuator
17. tubular body of actuator
18. external threads of actuator
19. inner surface of actuator
20. single-ended portion of lever
21. "Y" shaped lever
22. double-ended portion of lever
23. positions in which lever penetrates the actuator
24. bar formed by joining two ends of "Y" shaped lever
25. lever fittings
26. curve in lever
27. hose fitting
28. hose
29. optional pump (not shown)
30. protective cap
31. pull-tab on protective cap
32. swivel

DESCRIPTION OF THE PREFERRED EMBODIMENT

Drain Fitting

In the exploded view of FIG. 1, a drain fitting 1 includes a tubular body which is substantially the size and shape of a standard drain plug, having at the tail end 2 external threads 4 and having at the head end 3 a hexagonal bolt head 5. The particular type of structures connecting the invention to said oil pan 6 are not of significance with respect to the novel concepts of this invention. FIG. 2 is a cross section illustrating said drain fitting 1 inserted into the bottom of an oil pan 6.

In FIG. 3, said drain fitting 1 includes an axial passage 7 communicating through the entire length of said drain fitting 1. At said tail end 2 said axial passage 7 is internally threaded 8 or otherwise adapted to accommodate and secure an end cap 9. Said axial passage 7 is narrowed approximately where said external threads 4 meet said bolt head 5 to form a valve seat 10. Said axial passage 7 is enlarged and internally threaded 11 as it passes through said head end 3. Said external threads are perforated in two or more positions with drain holes 12 communicating between its internal and external surfaces.

A ball 13 reciprocates within said axial passage 7 between open and shut positions. A compression spring 14 biases said ball toward the closed position, engaging said ball 13 against an O-ring 15 and said valve seat 10. FIG. 4 illustrates the ball in an open position.

Actuator

In FIG. 5, an actuator 16 is comprised of a second tubular body 17, which body is externally threaded 18 to fit said internal threads 11 on said head end 3 of said drain fitting 1. The single-ended portion 20 of a "Y" shaped lever 21 lies against the inner surface of said actuator 19. The double-ended portion 22 of said lever 21 perforates said external threads 18 of said actuator 16 in two places 23, and forms a bar 24 in a partial circumference around said actuator 16. Said bar 24 extends a short distance from said external threads 18, and is secured therein by two pliable fittings 25. Said lever 21 is curved 26 and positioned such that tightening and loosening of said actuator 16 within said internal threads 11 forces said single-ended portion 20 of said lever 21 against said ball 13, thereby causing the opening and closing of said ball 13 against said O-ring 15 and said valve seat 10.

Said actuator 16 may be fitted by a hose fitting 27 to a hose 28 and optional pump (not shown) for convenient disposal of the oil to a remote receptacle (not shown). A swivel 32 permits the said tightening and loosening of said actuator 16 within said internal threads 11 to occur without twisting said hose 28. A protective cap 30 is held by friction within said head end 3 of said drain fitting 1 and is secured therein by said internal threads 11 when said drain fitting 1 is not in use. A pull-tab 31 permits grasping said protective cap 30 when said protective cap 30 is inserted into said head end 3 of said drain fitting 1.

Operation of the Invention

Said protective cap 30 is pried away from said head end 3 of said drain fitting 1. Said actuator is then screwed into said head end 3. During this process, said bar 24 will engage the base of said head end 3, thereby forcing said ball 13 away from said O-ring 15 and said valve seat 10. This permits the oil to flow through said drain holes 12, thence through said passage 7, said actuator 16, said hose 28, and said optional pump 29. Once the oil is either drained or pumped away from said oil pan 6, said protective cap 30 is pushed back into said head end 3.

Additional Embodiments

The presently described invention is not limited to draining automotive oil pans. It is also applicable to draining containers other than oil pans, and to substances other than oil. Furthermore, the invention is described using a spring-loaded ball valve, but the concept is applicable to any valve which can be operated by a removable lever. Finally, the invention is described using a specific lever mounted on an actuator, but the invention may use any manner of mechanically advantaged lever, handle, button or switch mounted on the actuator.

What is claimed is:

1. An apparatus for draining fluid from a fluid reservoir fitted for a drain plug, which apparatus comprises;

a normally closed drain valve;

the valve housed within a drain fitting not extending substantially farther from the fluid reservoir than would the drain plug;

the drain fitting having an axially disposed drain passageway with at least two ends, means on one end thereof for mounting the drain fitting onto the reservoir, and means on another end thereof for receiving;

a removable actuator having at least one wall, an axially disposed actuator passageway with at least two ends, and a means for inserting on one end thereof which mates with the means for receiving on the drain fitting, to fluidly couple the two passageways;

a lever having a first side, a second side and a pivot between the two sides, the lever sized, dimensioned and positioned such that the action of mating the actuator to the drain fitting causes the first side of the lever to be pushed away from the valve and the second side of the lever to be pivoted towards the valve to open the valve;

the lever further being mechanically advantaged such that upon mating of the actuator to the drain fitting, travel of the actuator upon the drain fitting is smaller than the corresponding travel of the second side of the lever.

2. The apparatus of claim 1 wherein the pivot is mounted through the wall of the actuator at the means for inserting, the first side of the lever projects away from the actuator passageway, and the second side of the lever projects into the actuator passageway.

* * * * *